(No Model.) 7 Sheets—Sheet 2.

F. H. RICHARDS.
SCREW MAKING MACHINE.

No. 537,854. Patented Apr. 23, 1895.

Witnesses:
Robt. Ruddell
Fred. J. Dole.

Inventor:
F. H. Richards (No Model.) 7 Sheets—Sheet 3.

F. H. RICHARDS.
SCREW MAKING MACHINE.

No. 537,854. Patented Apr. 23, 1895.

Witnesses:
Robt. Buddell,
Fred. J. Dole.

Inventor:
F. H. Richards (No Model.) 7 Sheets—Sheet 4.

F. H. RICHARDS.
SCREW MAKING MACHINE.

No. 537,854. Patented Apr. 23, 1895.

Fig. 5.

Witnesses:
Robt. Ruddell
Fred. J. Dole.

Inventor
F. H. Richards (No Model.) 7 Sheets—Sheet 5.

F. H. RICHARDS.
SCREW MAKING MACHINE.

No. 537,854. Patented Apr. 23, 1895.

Witnesses:
Robt Ruddell
Fred. J. Dole.

Inventor:
F. H. Richards (No Model.)  7 Sheets—Sheet 6.

F. H. RICHARDS.
SCREW MAKING MACHINE.

No. 537,854.  Patented Apr. 23, 1895.

Witnesses:
Robt. Ruddell
Fred. J. Dole.

Inventor:
F. H. Richards (No Model.) 7 Sheets—Sheet 7.

F. H. RICHARDS.
SCREW MAKING MACHINE.

No. 537,854. Patented Apr. 23, 1895.

Witnesses:
Robt. Ruddell
Fred. J. Dole.

Inventor:
F. H. Richards

UNITED STATES PATENT OFFICE.

FRANCIS H. RICHARDS, OF HARTFORD, CONNECTICUT.

SCREW-MAKING MACHINE.

SPECIFICATION forming part of Letters Patent No. 537,854, dated April 23, 1895.

Application filed June 18, 1894. Serial No. 514,897. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Screw-Making Machines, of which the following is a specification.

This invention relates to screw-making machines.

The object of my present invention is to furnish a machine of compact and simplified construction adapted for automatically making screws from a coil of wire, or a rod of indefinite length; also to provide means in connection with the wire-feeding mechanism and tool-carrier whereby the one will have an intermittent oscillatory and reciprocatory movement relatively to the other; also to provide means whereby the entire machine may be run by a single driving belt, to thereby obviate the multiplicity of gears usually employed in machines of this class.

In the drawings accompanying and forming part of this specification.

Similar characters designate like parts in all of the figures.

In the embodiment of my invention herein shown and described, the screw-making machine comprises, in part, a suitable framework, a shaft mounted thereon for oscillatory and reciprocatory movements, a tool-head, a work-head having wire-carrying means controlling the positioning of the wire relatively to the tool-head, means for intermittently reciprocating one of the heads with the shaft relatively to the other head, means for intermittently oscillating one of said heads with the shaft relatively to the other head to bring into axial alignment the wire carried by the work-head and any one of the tools carried by the tool-head, a plurality of tools carried by the tool-head and equidistantly disposed with relation to the shaft and controlling the screw forming operations upon said wire and each serving to co operate with the wire-carrying means of the work-head, mechanism for revolving one of said wire-controlling means relatively to the co-operating wire-controlling means of the other head, and means carried by the work-head for supporting the wire at the same distance from the shaft as the tools are supported, all of which will be hereinafter more fully described.

The framework, designated in a general way by A, and which may be of any suitable construction for carrying the several operative details of the machine, is shown consisting of the base 2, having uprights 3 and 4, at opposite ends thereof, and the bed B, having horizontal slide-ways 5 and 5', arranged in vertical alignment. This bed B, which constitutes the framework proper of the machine, is shown located at one side of the uprights 3 and 4, or at one side of a central longitudinal line drawn through the bed of the machine.

Supported in bearings 6 and 6', formed in the uprights 3 and 4 at one side of the bed B and preferably in horizontal alignment with the space between the slide-ways 5 and 5' thereof, is a cam-shaft C, which, as will be hereinafter described, is provided with a series of cams for operating certain of the elements of the machine.

Figure 1:
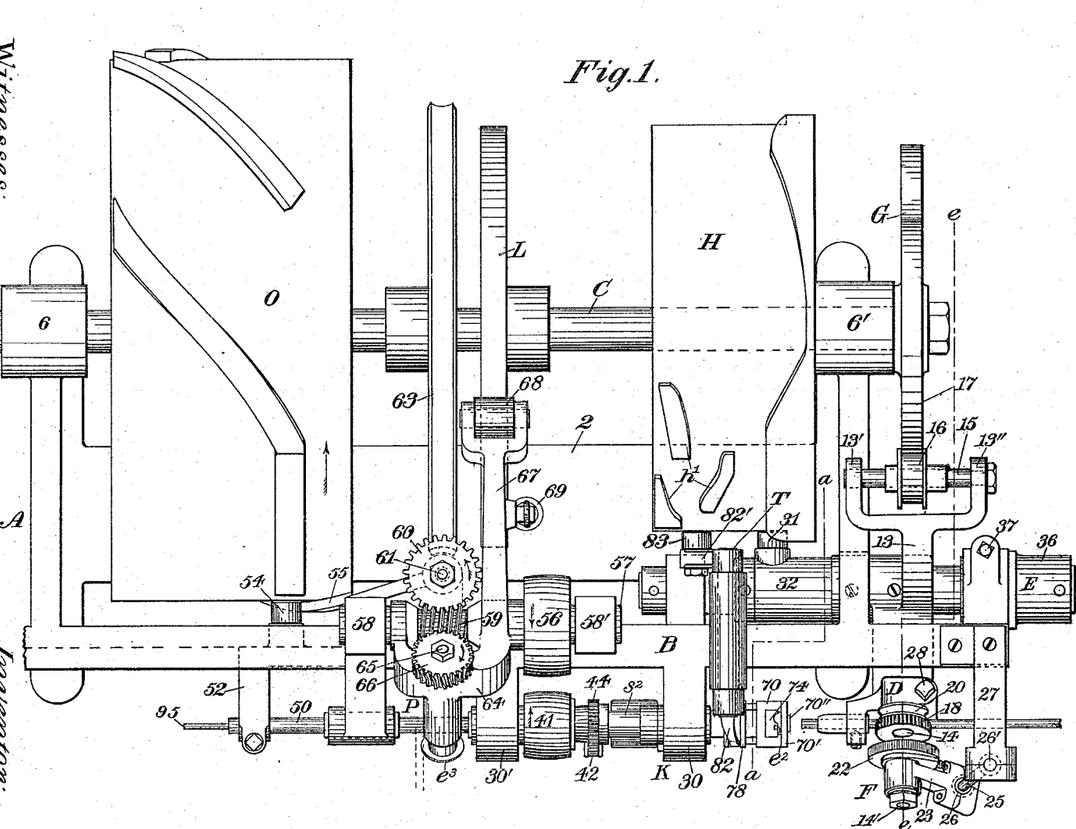
Figure 1 is a plan view of a screw-making machine embodying my invention.
Figure 2:
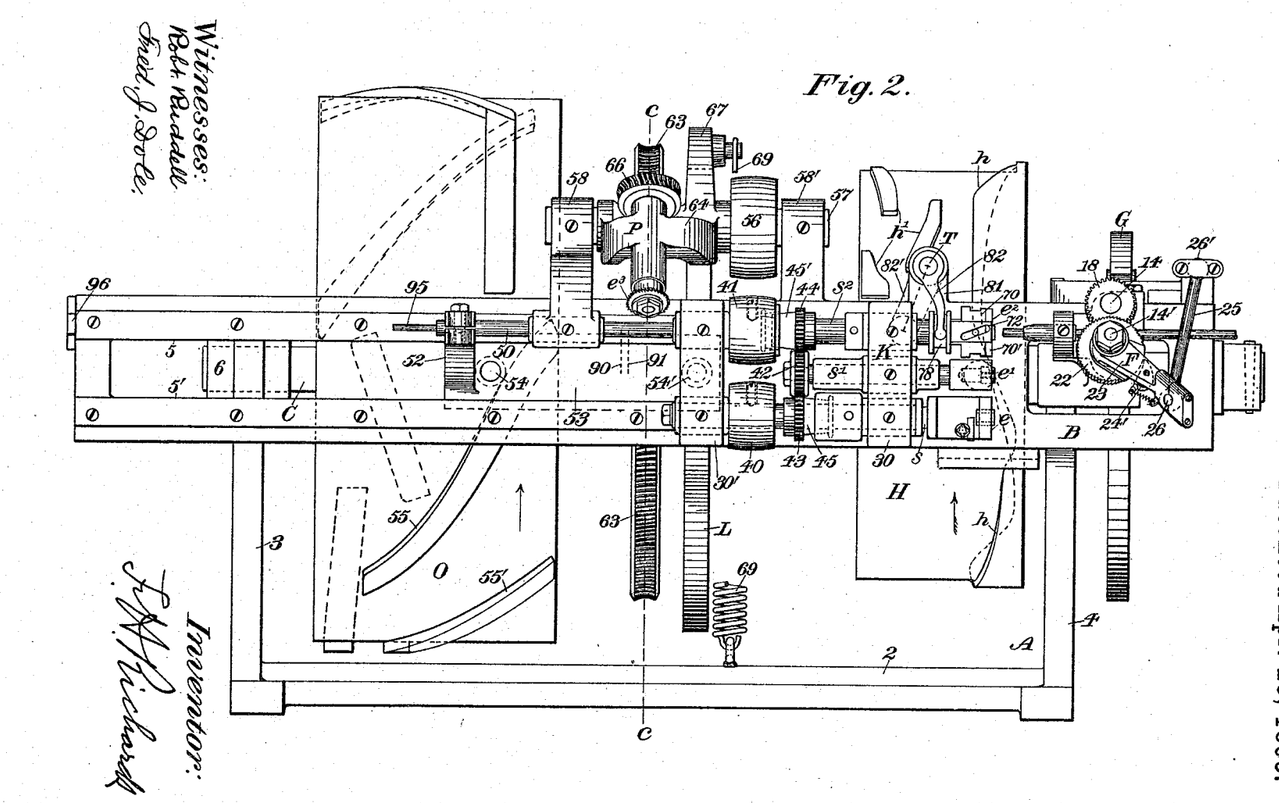
Fig. 2 is a side elevation of the same as seen from the under side in Fig. 1.
Figure 5:
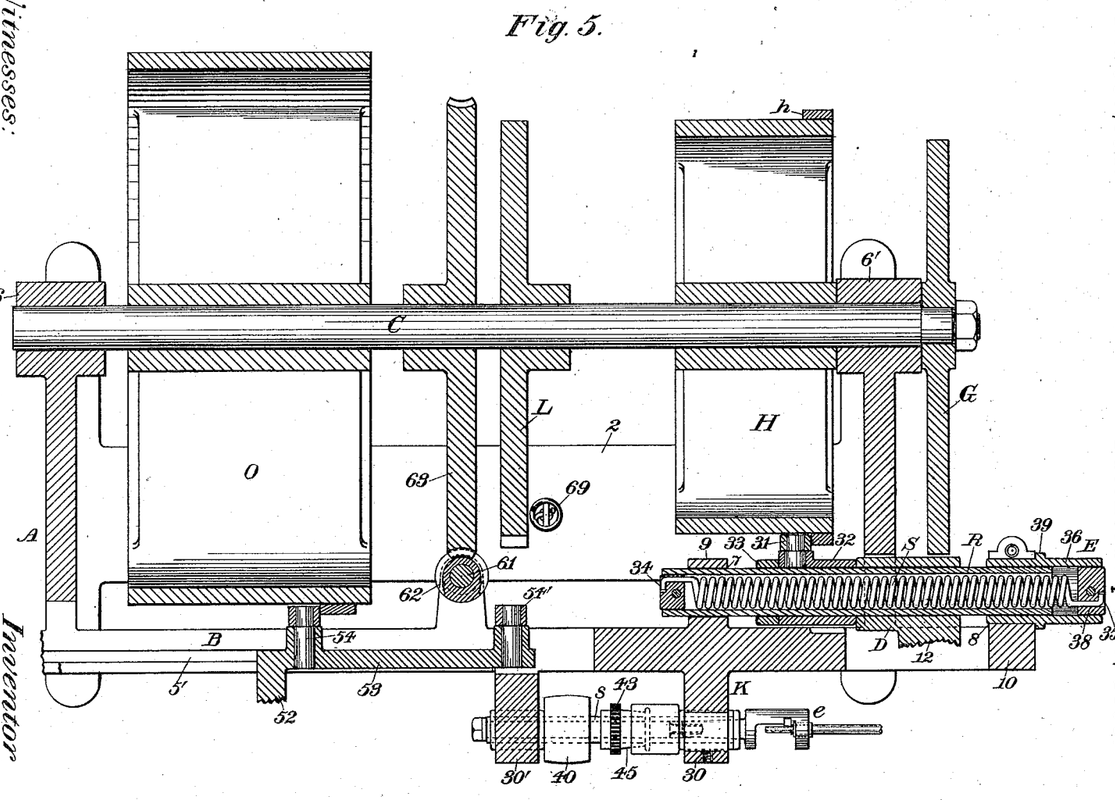
Fig. 5 is a sectional plan view of a portion of the machine, taken in line *b—b*, Fig. 3, the wire-feeding mechanism being broken away.

Located intermediate to the cam-shaft C and bed B and preferably in horizontal alignment with said shaft C, is a rock-shaft R, which rock-shaft is shown of tubular form, and is supported for longitudinal and oscillatory movements in bearings 7 and 8, in remotely-disposed laterally projecting brackets 9 and 10, upon the bed B at one end thereof, shown in Figs. 1, 2 and 5, as the right hand end. This rock-shaft constitutes an important element in this invention, and inasmuch as its axial position, during operation, is in no-wise changed with relation to the several operative details of the machine, it will for the purpose of distinguishing its relation to certain elements of the machine, be hereinafter termed the "fixed axis," and its construction, organization and operation will be hereinafter more fully defined. Carried upon this rock-shaft R so as to oscillate therewith is a work-head or carrier D, which carrier, in the form thereof herein shown, is of somewhat bell-cranked construction, it comprising two oppositely-disposed projecting arms 12 and 13; the one 12 of which constitutes a carrier-arm for the wire-supporting and feeding mechanism, designated in a general way by F, it having its outer end laterally flanged as shown at 12' and 12", and transversely bored to form bearings for studs 14 and 14' upon which are revolubly-mounted the wire-supporting and feeding wheels of the wire-supporting and feeding mechanism as will be hereinafter more fully described, while the arm 13 of said carrier is forked or bifurcated at its outer end to form remotely-disposed arms 13' and 13", which arms are transversely bored and have secured therein a pin or shaft 15, upon which is mounted for transverse and rotary movements, an idle-wheel 16, adapted for engagement with the working-face of a cam G, secured to the cam-shaft C, which cam is of a construction adapted for imparting the requisite intermittent oscillating movement to the carrier D and its fixed axis or rock shaft R.

The wire-supporting and feeding-mechanism, in the form thereof herein shown, comprises two intermeshing gear-wheels 18 and 19, revolubly-carried upon the studs 14 and 14', respectively, fixed in the bearings formed in the flanges 12' and 12" of the carrier-arm 12, two wire-grasping wheels, 20 and 21, carried preferably upon the hubs of said gear-wheels 18 and 19, a ratchet-wheel 22, carried by one of said gear-wheels, a feed-lever 23, revolubly-mounted at one end upon a collar 24 carried upon the stud 14', concentric to the ratchet wheel 22, a pawl 24', carried by said feed-lever in position and adapted for engaging the teeth of the ratchet-wheel 22, and a link 25, having a universal or ball-and-socket connection at one end as at 26, with the outer end of the feed-lever, and at its opposite ends as at 26', with an arm 26", secured to or formed upon the bed B of the machine.

The forward end of the carrier-arm 12 is longitudinally notched or slotted as shown at 27, intermediate to the axes of the studs 14 and 14', (see Figs. 9 and 10,) and is provided with a clamp-screw 28, which extends transversely through said slotted portion at one side of said studs, and is adapted for adjusting the wire-grasping wheels laterally with relation to each other to take up wear and accommodate said wheels to variations in diameters of the wire, which will hereinafter be referred to as a "screw-forming element," the teeth of the gear-wheels being sufficient in depth and the gear-wheels being so disposed as to conform to variations in axial-relation.

Revolubly-supported in a tool-head, designated by K, which comprises two laterally-projecting arms upon the bed B, and located in the plane of movement of the feed-wheels 20 and 21, are a series of tool-carrying spindles, $s$, $s'$ and $s^2$—carrying tools adapted for operating successively upon the wire or rod carried by the wire-carrier D, and which tools will also, hereinafter, sometimes be referred to as "screw-forming elements." These arms 30 and 30' constitute what will be hereinafter termed the "fixed tool-head," the spindles thereof being equi-distantly-disposed with relation to the "fixed axis" or the rock-shaft R, mechanism being provided for simultaneously rotating said spindles, as will be hereinafter fully described. It will also be understood that the wire is supported by the carrier, or work-head, in the path of the tool-spindles and equidistant therewith from the "fixed axis" or rock-shaft R, so that the relative positions of the spindles and the wire, with respect to said shaft, are the same, and remain unchanged during the operation of the machine.

As a means for imparting the requisite oscillatory and reciprocatory movements to the wire-carrier with relation to the fixed tool-head, I have provided two cam-wheels G and H, respectively, carried upon the cam-shaft C, the one G of which has a series of working faces $g$, herein shown as three in number and adapted for imparting the requisite intermittent oscillatory movements to the carrier, and the one H of which has a cam-face $h$, of a construction adapted for imparting the requisite reciprocatory movement to said carrier and its shaft. These cams are operatively-connected with the carrier and its shaft, the one G by means of the idle-wheel 16 carried at the outer end of the arm 13 of the carrier and bearing against the working faces of said cam, and the one H by means of a stud or projection 31, upon a collar 32, supported upon the rock-shaft R between the carrier D and an abutment 33, fixed upon said shaft R, which stud or projection bears against the working face $h$ of said cam H. This cam will also preferably have a series of working faces $h'$, adapted for operating a tool-traversing shaft T, as will be hereinafter more fully described.

As a means for retaining the cam-engaging end of the carrier D and the stud or projection 31 in operative engagement with the working faces of the cams G and H, I have provided a retracting device, which in the form thereof herein shown is in the nature of a combined torsion-and-pull spring S. This spring, which is preferably supported within the tubular rock-shaft R, is fixed at its inner end, as shown at 34, to the inner end of said shaft, and is fixed at its outer end, as shown at 35, to a tension device, designated in a general way by E, adjustably-clamped in the bracket 10, which tension-device will preferably consist of a sleeve 36, clamped between the resilient arms of said bracket 10 by means of clamp-screws 37, and carrying at the outer end thereof a fixed plug, 38, to which the outer end of the spring S is secured. This sleeve constitutes the bearing 8 for the outer end of the tubular rock-shaft R, as will be understood by reference to Fig. 5 of the drawings, and is provided with an annular flange 39, which abuts against the outer face of the bracket and prevents longitudinal movement of the sleeve with relation to said bracket. This construction and organization just described forms a simple, compact and effective retracting device for the wire-carrier D and insures a constant working-engagement between said carrier and its actuating-cam.

In the drawings I have shown a series of tool-spindles $s$, $s'$ and $s^2$, revolubly-carried in the fixed head K, the one $s$ carrying a turning or screw-shank-forming tool $e$, the one $s'$ carrying a threading-tool $e'$, and the one $s^2$ carrying a cutting-off tool $e^2$, the turning-tool and threading-tool being of any usual or suitable construction for turning down and threading the end of the screw-forming rod or wire. The spindles $s$ and $s^2$ are provided with driving pulleys, 40 and 41, respectively, through the medium of which said spindles are driven by a belt W, in the manner hereinafter more fully described. The spindle $s'$, which is adapted for longitudinal movement in its bearings, is revolubly-connected with the spindles $s$ and $s^2$ by a pinion 42, carried at one end thereof meshing with pinions 43 and 44, supported for sliding and rotary movements upon the spindles $s$ and $s^2$, respectively. The pinions or gear-wheels 43 and 44 have oppositely-disposed conical hubs 45 and 45', adapted for alternately engaging the conically-tapered rims of two clutch-members 41 and 41', the one 41 of which is secured, as before stated, to the spindle $s^2$ and constitutes the driving pulley therefor, and the other member of which is secured to the spindle $s$. This construction and organization forms a simple and compact device for alternately revolving the screw-threading tool, or die, carried by the spindle $s'$ in opposite directions as is necessary when cutting the thread upon the screw-rod and screwing-off the threading-die after the thread has been formed. It will also be seen that the friction-clutch is automatic in its operation, as when the wire-carrier D, advancing in its movement toward the tool-head, brings the wire into engagement with the threading-die, said threading-die is forced backward with its spindle which brings the clutch-member upon the spindle $s^2$ into engagement and revolves the spindle $s'$ in the requisite direction for cutting the thread, and the retractive movement of said carrier, after the screw-thread has been formed will carry the spindle $s'$ with it until the clutch-members carried by the spindle $s$, are brought into operative engagement, which will at once reverse the movement of said spindle $s'$ and unscrew the die from the screw-rod.

In the form thereof herein shown, the cutting-off tool spindle $s^2$ is of tubular form and has mounted therein for reciprocatory movement a screw-blank carrier 50, which screw-blank carrier, is in the nature of a hollow chuck adapted for engaging the shank of the screw-blank after the same has been cut off from the screw-rod, and for carrying the same backward into position to be operated upon by the slotting-saw, or tool $e^3$.

As a means for retracting and advancing the screw-blank-carrier, or chuck 50, said carrier is clamped at one end between resilient jaws of a laterally projecting arm 52, carried upon a slide 53, supported for sliding movement in the slide-ways 5 and 5' of the bed B of the machine, said slide being provided with two remotely-disposed laterally-projecting lugs, or pins 54 and 54', adapted to be alternately engaged by the working-faces 55 and 55', of a cam O, fixed to the cam-shaft C. By providing the cam O with two sets of working-faces 55 and 55', respectively, the receiving-end of one being approximately in horizontal alignment with the delivering-end of the other, and by providing the slide 53 with two remotely-disposed lugs or pins, the distance between which correspond, or approximately correspond to the distance between the adjacent ends of the two working-faces of the cam, I am enabled to secure the requisite movements of the slide by one cam-wheel, which is advantageous in machines of this class.

As a means for actuating all of the working parts of the machine by a single belt, I have provided a main driving-wheel 56, which is secured to a horizontal worm-shaft 57, journaled in uprights 58 and 58', upon the bed of the machine, said shaft carrying a worm 59, which meshes with a worm-wheel 60, fixed to the upper end of a worm-shaft 61, journaled in vertical bearings formed in the bed B of the machine and carrying a worm 62, which meshes with a worm-wheel 63, secured to the cam-shaft C. This driving-pulley 56 is driven by means of the belt W, which belt extends over the driving-pulley and alternately around the opposite sides of the successive pulleys of the tool-spindles. Said belt passes partially around and under said pulley 56, over and partially around the pulley 41 upon the spindle $s^2$, and partially around and under the pulley 40 upon the spindle $s$, and extends to a pulley (not shown) driven from any suitable source of power. By the means just described, power is applied directly to these tool-carrying spindles from the belt without the intervention of gearing commonly employed for this purpose in machines of similar character.

As a means for slotting the screw-head, I have provided an oscillating slotting-tool-carrier P, which is shown pivotally-supported upon the horizontal worm-shaft 57, and is provided at the side thereof adjacent to the screw-blank-carrier 50 with an outwardly-extending arm 64, having a central bearing in which is journaled a spindle 65, at the outer end of which is mounted the slotting-saw $e^3$, and at the inner end of which is mounted a worm-wheel 66, which meshes with, and is driven by, the worm 59 upon the worm-shaft, or driving-shaft 57, and at the opposite side of the axis of said slotting-tool-carrier is a laterally projecting arm 67, carrying a roller 68, at the end thereof, which roller is held in contact with the working face of a cam L, by means of which cam the slotting-tool is oscillated to bring it into working position in alignment with the axis of the screw-blank-carrier 50, the working-end of said arm 67 being held in operative engagement with the cam L by means, preferably, of a pull-spring 69, secured at one end to said arm, and at its opposite end to a convenient part of the frame of the machine, herein shown as the base of the machine.

Figure 11:
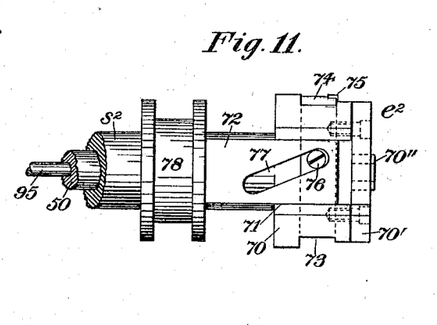
Fig. 11 is a side elevation, on an enlarged scale, of the device or tool employed for shaping the head of, and cutting off the screw.
Figure 12:
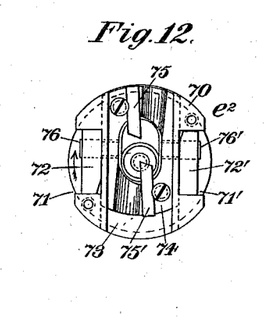
Fig. 12 is an end view of the same, looking toward the left hand in Fig. 11, the face-plate or cap thereof being removed.
Figure 13:
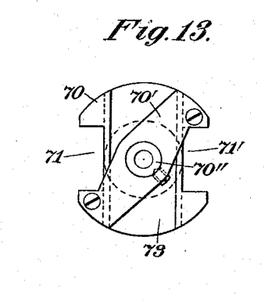
Fig. 13 is an end view of the tool-carrying head of said device with the rod-supporting cam secured thereto, but with the head-forming tool and cutting-off tool and their slides removed.
Figure 14:
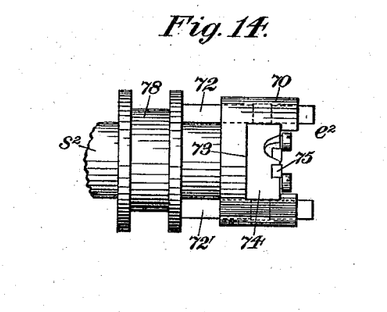
Fig. 14 is a plan view of the tool for forming the head of, and for cutting off the screw, the cap or face-plate thereof being removed.
Figure 15:
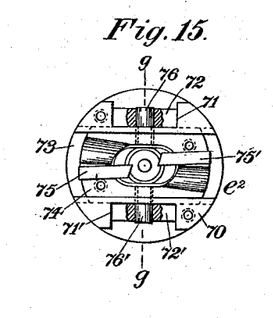
Fig. 15 is an end view drawn in projection with Fig. 14, the cutting-off tool and the head-forming tool being shown in a different position from that shown in Fig. 12.
Figure 16:
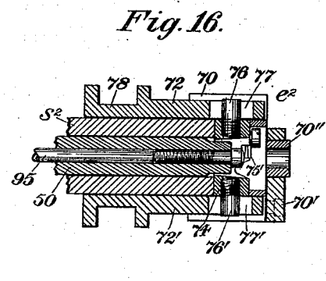
Fig. 16 is a vertical longitudinal section of the same taken in line *g—g*, Fig. 15, with the face-plate secured thereto, said figure showing the screw-engaging chuck or carrier with a completed screw supported therein in position to be carried back to be presented to the action of the slotting-saw.

The device for shaping the head of, and cutting-off the screw-blank, which for convenience is herein termed the cutting-off tool $e^2$, consists of the spindle-head 70, grooved at opposite sides thereof, as shown at 71 and 71', in Figs. 11, 12 and 13, to form slide-ways for tool-traversing cams or slides 72 and 72', respectively, supported for sliding movement therein, said head being transversely recessed, as shown at 73, to form a slide-way for a tool-carrying slide 74, which is supported for sliding movement therein and carries two oppositely-disposed tools 75 and 75' one of which is adapted for shaving or forming the head of the screw-blank, and the other of which is adapted for cutting off said blank from the screw-rod.

As a means for operating the tool-slide 74 to alternately bring the tools 75 and 75' into working position, said slide is provided at opposite sides thereof with outwardly extending pins 76 and 76', which extend through obliquely-disposed cam-grooves or slots 77 and 77', formed through the traversing-cams or slides 72 and 72', respectively, which traversing-cams are preferably formed integral with a peripherally-grooved hub or collar 78, supported for sliding movement upon the spindle $s^2$, and as a means for operating the traversing cams of the spindle-head, I have provided a rock-shaft T, which is journaled in a horizontal transverse bearing formed in a bracket 81, upon the bed of the machine, which shaft has depending arms 82 and 82', at opposite ends thereof, the arm 82 of which is bifurcated and engages between the flanges of the grooved hub 78, and the arm 82' of which is provided with a stud 83, which engages the working-faces $h'$ of the cam H, by means of which cam H the said shaft T is rocked to reciprocate the tool traversing cams 72 and 72' to advance one or the other of the tools 75 and 75' with relation to the screw-forming rod. The spindle-head 70 is provided at its outer end with a cap 70', which is centrally-bored transversely and provided with a bushing 70'', which forms a support for the screw-rod during the head-shaping and cutting-off operations. This cap, which will be hereinafter termed the "rod-support" constitutes an important factor in this invention, as it provides for the support of the screw-rod in close proximity to the cutting points of the tools and prevents any vibration of said rod during the cutting operation.

It will be understood that the cams and driving mechanisms for actuating the several operative details of the machine and the driving-mechanism for the tool-spindles and cam-shaft, are so constructed, organized and timed in their movements relatively to each other as to impart the requisite movements to said operative parts.

Figure 3:
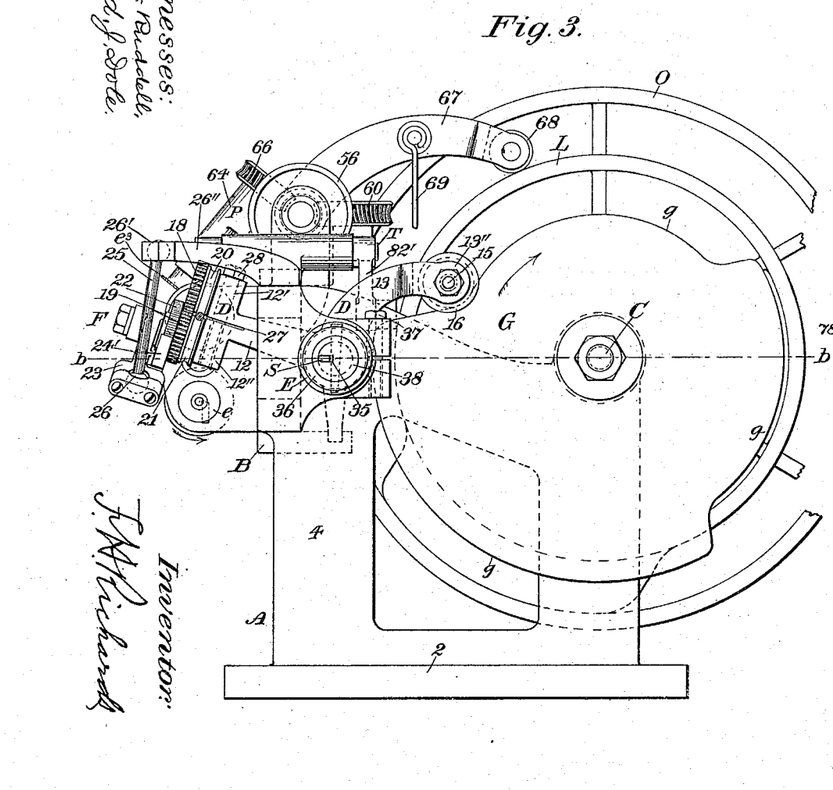
Fig. 3 is an end view of the screw-making machine as seen from the right hand in Fig. 2, a portion thereof being broken away.
Figure 4:
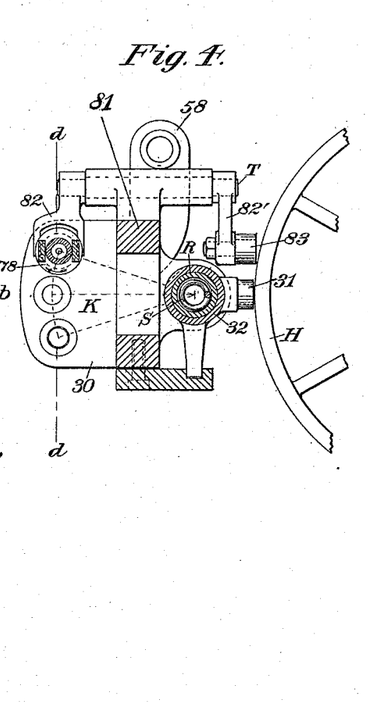
Fig. 4 is a cross-sectional view of a portion of the machine taken in line *a—a*, Fig. 1, looking toward the left hand in said figure.
Figures 6, 7:
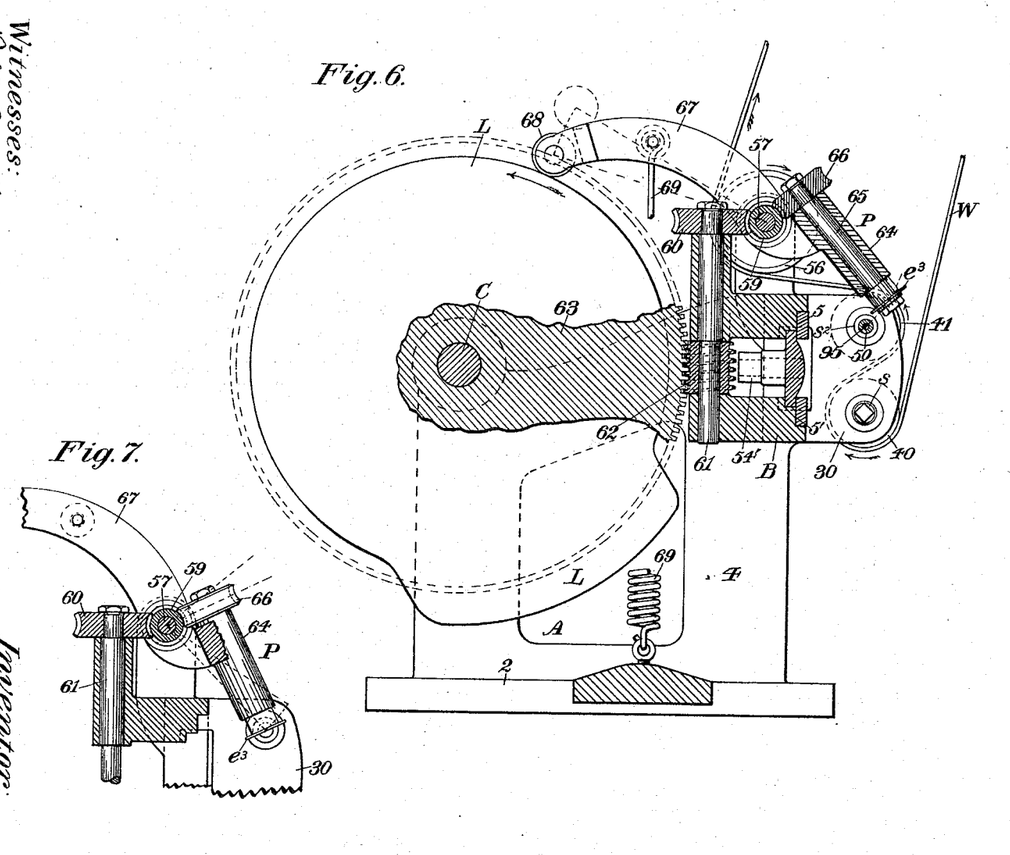
Fig. 6 is a cross-sectional view of a portion of the machine taken in line *c—c*, Fig. 2, looking toward the right hand in said figure, portions thereof being broken away, said figure illustrating the screw-head-slotting mechanism in its normal inoperative position.
Fig. 7 is a like view of a portion of the screw-head-slotting mechanism showing the slotting-saw in its working position or in the position it occupies when slotting a screw-head.
Figure 9:
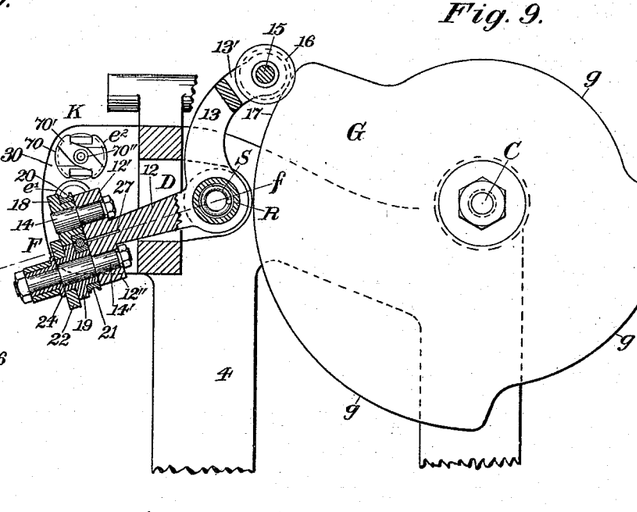
Fig. 9 is a vertical cross-section of a portion of the machine, taken in line *e—e*, Fig. 1, looking toward the left hand in said figure, said figure illustrating the wire-feed mechanism, tool-carrying head, and means for oscillating said feed-mechanism.
Figure 10:
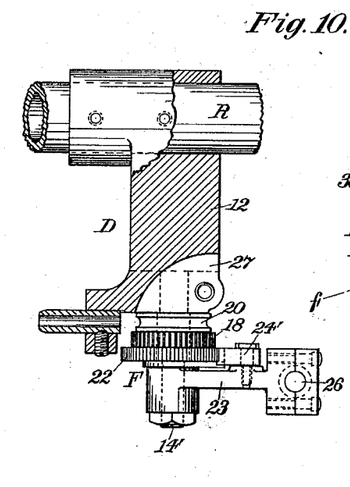
Fig. 10 is a sectional plan view, on an enlarged scale, of a portion of the feed-mechanism, taken in line *f—f*, Fig. 9, looking downward in said figure.

The operation of the machine is as follows:—Assuming the wire-carrier D and cooperative parts to be in position illustrated in Figs. 1 and 3, the rotation of the cam-shaft C, first operates to cause the cam G to throw the wire-carrier from the position shown in Fig. 3 to that shown in Fig. 9, which movement of the carrier will cause the outer end of the feed-lever 23 to be elevated which, through the medium of the pawl carried thereby, in engagement with the ratchet-wheel 22, will rotate the feed-wheels 20 and 21, moving the rod or screw-forming element forward the requisite distance to be operated upon by the turning-tool or co-operating screw-forming element $e$, after which the working-face $h$ of the cam H operates to advance to the carrier, bringing the rod into operative engagement with the said turning-tool, which being continuously rotated by means of the belt W, turns down or reduces the end of said rod. After this operation has been completed, the carrier is retracted by means of the cam, H, then elevated by means of the cam G to bring the rod carried thereby into alignment with the next successive tool or screw-forming element of the tool-head, when it is again advanced, which subjects the end of the rod to the action of the screw-threading die $e'$ which forms the screw-thread thereon, when it is again retracted, elevated, and advanced to bring the wire into position to be operated upon by the head-forming and cutting-off tools, which tools or screw-forming elements are then successively advanced through the medium of the tool-traversing cams 72 and 72', the rock-shaft T, and the cam-faces $h'$ of the cam-wheel H. Just prior to the cutting-off of the screw-blank from the continuous rod, the screw-blank-carrier 50, is advanced and engaged with the shank of said blank by means of the cam O and slide 53, connected with said carrier, and after the screw-blank has been cut off, said carrier is retracted by means of the cam O, bringing the head of the blank back to the position shown by dotted lines 90 in Fig. 2, when the slotting-saw-carrier P, is tilted to the position shown in Fig. 7 with its slotting saw $e^3$ into position for operating upon the head of the screw-blank, after which the screw-blank-carrier 50 is moved forward a distance equal to the distance between the dotted lines 90 and 91 shown in Fig. 2 which slots the screw-head. During this operation the wire carrier is returned to its first position and the operation of turning down and screw-threading the end of the screw-rod is in progress, the time required for retracting the screw-blank carrier, slotting the screw-blank and advancing said carrier being approximately that required for retracting the wire-carrier, turning down, and screw-threading the end of the screw-blank and shaping the head of, and cutting off the screw-blank.

Figure 8:
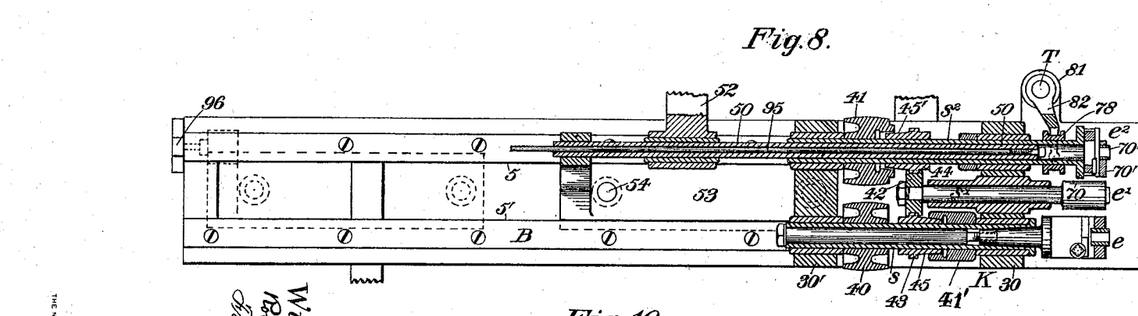
Fig. 8 is a vertical longitudinal section of a portion of the machine taken in line *d—d*, Fig. 4 looking toward the right hand in said figure, and illustrating the construction and organization of the tool-carrying mechanism.

As a means for ejecting the finished screw from the screw-blank carrier after the operation of slotting the head of said blank has been completed, I have provided an ejector, which in the form thereof herein shown is in the nature of a rod 95, supported for longitudinal movement in said carrier with one end thereof projecting beyond the rear end of said carrier, the opposite end of said rod being adjacent to the ends of the screw-blank. This ejector is forced forward by an abutment 96, upon the bed of the machine with which said ejector is brought into contact by a retractive movement of the screw-blank-carrier after the head of the screw-blank has been slotted, as will be fully understood by reference to Figs. 5 and 8 of the drawings.

Having thus described my invention, I claim—

1. In a screw-making machine, the combination with a shaft supported for oscillatory and reciprocatory movements, of a tool-head and a work-head, means for intermittently reciprocating one of these heads with said shaft relatively to the other head, means for intermittently oscillating one of said heads with said shaft relatively to the other head and thereby bringing into axial alignment the wire carried by the work-head and a tool carried by the tool-head, a plurality of tools carried by said tool-head and equidistantly disposed with relation to the shaft, and means carried by the work-head for supporting the wire at the same distance from the shaft as the tools are supported, substantially as described.

2. In a screw-making machine, the combination with a shaft supported for oscillatory and reciprocatory movements, of a tool-head and a work-head, means for intermittently reciprocating one of these heads relatively to the other head, means for intermittently oscillating one of said heads with said shaft relatively to the other head and thereby bringing into axial alignment the wire carried by the work-head and a tool carried by the tool-head, a plurality of tools carried by said tool-head and adjacent to the work-head and equidistantly disposed with relation to the shaft, wire-feeding mechanism carried by the work-head and in position and adapted for supporting a wire in parallelism with the shaft, and means for intermittently operating said feeding mechanism to feed said wire into position to be operated upon by the successive tools of the tool-head, substantially as described.

3. In a screw-making machine, the combination with a shaft supported for oscillatory and reciprocatory movements, of a tool-head and a work-head, means for reciprocating one of these heads with said shaft relatively to the other head, a plurality of tools carried by the tool-head and equidistantly disposed with relation to the shaft, means for rotating said tools, means for supporting the work-head for oscillatory movement with said shaft in the path of said tools and for supporting a wire in parallelism with said shaft, and means for oscillating said work-head to thereby bring said wire into axial alignment with said respective tools, substantially as described.

4. In a screw-making machine, the combination with a shaft supported for oscillatory and reciprocatory movements, of a plurality of tools revolubly supported in an arc of a circle with their axes equidistantly disposed with relation to said shaft, a wire-feed carrier supported for movement with said shaft in the path of said tools, means for intermittently oscillating said shaft to thereby bring the wire into alignment with said respective tools, means for intermittently reciprocating said shaft, and means for rotating said tools, substantially as described.

5. In a screw-making machine, the combination with a shaft supported for oscillatory and reciprocatory movements, of a series of revoluble spindles equidistantly disposed with relation to said shaft, a carrier supported for oscillatory and reciprocatory movements with said shaft, a wire-feed device mounted upon said carrier and in position and adapted for presenting a wire successively to the tools carried by said spindles, a cam in operative connection with said carrier, and means for actuating said cam, substantially as described.

6. In a screw-making machine, the combination with a shaft supported for oscillatory and reciprocatory movements, of spindles revolubly supported with their axes parallel to and equidistantly disposed with relation to said shaft, a wire-carrier supported for oscillatory movement with said shaft and for reciprocatory movement with said shaft toward and from said spindles, a wire-feeding device mounted upon said carrier and comprising adjacent feed-wheels and pawl-and-ratchet mechanism in connection with said feed-wheels, and means controlled by the oscillation of said carrier for operating said feed-wheels, substantially as described.

7. In a screw-making machine, the combination with a shaft supported for oscillatory and reciprocatory movements, of a wire-carrier mounted upon said shaft for movement therewith, and a plurality of spindles revolubly supported with their axes parallel to and concentric with the axis of said shaft, substantially as described.

8. In a screw-making machine, the combination with a shaft supported for oscillatory and reciprocatory movements, of a wire-carrier mounted upon said shaft for movement therewith, a fixed tool-head having a plurality of spindles revolubly connected and supported with their longitudinal axes concentric to the axis of said shaft, and means for continuously rotating said spindles, substantially as described.

9. In a screw-making machine, the combination with a shaft supported for oscillatory and reciprocatory movements, of a series of horizontally-supported revoluble spindles in parallelism with said shaft, and a wire-carrier mounted upon said shaft for movement therewith and adapted for reciprocation toward and from said spindles, substantially as described.

10. In a screw-making machine, the combination with a shaft supported for oscillatory and reciprocatory movements, of a wire-carrier mounted upon said shaft for movement therewith, a plurality of tools revolubly supported concentric to said shaft, driving mechanism for said tools, a revoluble cam in connection with said shaft and adapted for intermittently oscillating the same, means for revolving said cam, and means for intermittently reciprocating said shaft, substantially as described.

11. In a screw-making machine, the combination with a shaft supported for oscillatory and longitudinal-reciprocatory movements, of a tool-head, a work-head, and connections operative from said shaft for oscillating and reciprocating one of these heads relatively to the other, substantially as described.

12. In a screw-making machine, the combination with a horizontally-supported shaft mounted for oscillatory and reciprocatory movements, of a series of revoluble spindles disposed concentrically and in parallelism with said shaft, a wire-carrier mounted upon said shaft for movement therewith, a wire-feed device carried by said carrier adjacent to said spindles, and actuating mechanisms for said spindles and carrier and feed-device, substantially as described.

13. In a screw-making machine, the combination with a plurality of spindles revolubly supported with their axes equidistantly disposed with relation to a fixed axis, of a wire-carrier supported for oscillating and sliding movement upon said fixed axis, a cam for oscillating said carrier, a cam for reciprocating said carrier, and a combined torsion-and-pull spring in position and adapted for retaining the carrier in operative engagement with said cams, substantially as described.

14. In a screw-making machine, the combination with a rock-shaft supported for longitudinal movement, of a plurality of spindles supported for rotation in a fixed head with their axes in parallelism with and equidistantly disposed with relation to said rock-shaft, a wire-feeding device carried upon said rock-shaft and oscillatory therewith and in position and adapted to present a wire successively to the several tools carried by said spindles, cams in connection with said shaft and adapted for rocking and reciprocating the shaft and the wire-feeding device, and means for operating said wire-feeding device, substantially as described.

15. In a screw-making machine, the combination with a plurality of tool-carrying spindles revolubly supported concentric to a common center, of a rock-shaft supported for longitudinal reciprocation in bearings concentric to said spindles, a wire-carrier carried by said shaft and in position to present a wire successively to the tools carried by said spindles, a cam for rocking said shaft and carrier, a cam for reciprocating said shaft and carrier, and a retracting spring in connection with and adapted for retaining said shaft and carrier in operative engagement with said cam, substantially as described.

16. In a screw-making machine, the combination with an oscillating carrier, and with means for moving said carrier in one direction, of a torsion spring concentric to the axis of said carrier and adapted for moving said carrier in the opposite direction, substantially as described.

17. In a screw-making machine, the combination with a carrier supported for oscillatory and reciprocatory movements, and with means for oscillating and reciprocating said carrier, of a combined torsion-and-pull spring mounted within and adapted for imparting return oscillatory and reciprocatory movements to said carrier, substantially as described.

18. In a screw-making machine, the combination with a plurality of spindles revolubly supported with their axes equidistant with relation to a common center, of a wire-carrier pivotally supported with its axis in alignment with said common axis and adapted for reciprocatory movement toward and from said spindles, a cam in connection with and adapted for oscillating said carrier in one direction laterally of said spindles, and a spring within said carrier for imparting return reciprocatory and oscillatory movements to said carrier, substantially as described.

19. In a screw-making machine, the combination with the cam-shaft and with a plurality of tool-carrying spindles, of a driving shaft operatively connected with the cam-shaft by suitable gearing and carrying a driving-pulley, pulleys carried by the tool-spindles, and a belt extending over the driving-pulley and spindle-pulleys and adapted for simultaneously rotating said spindles and the cam-shaft, substantially as described.

20. In a screw-making machine, the combination with a cam-shaft carrying a series of cams for operating certain details of the machine, and with a plurality of revoluble spindles carrying belt-pulleys; of driving mechanism therefor consisting of a driving-shaft carrying a driving-pulley and a worm, a worm-wheel carried by the cam-shaft, an intermediate shaft carrying a worm in connection with the cam-shaft worm-wheel and carrying a worm-wheel in mesh with a worm of the driving-shaft, and a driving-belt extending over the driving-pulley and alternately around the opposite sides of the successive pulleys of the tool-spindles, substantially as described.

21. In a screw-making machine, the combination with the main driving-shaft, of screw-forming mechanism, a screw blank carrier parallel with said shaft, a second shaft parallel with said screw-blank carrier, a slotting-tool carrier supported for swinging movement upon said second shaft, a slotting-tool mounted upon said carrier, means for oscillating said carrier and the tool carried thereby, and connecting gearing between said shafts and tool for revolving the tool, substantially as described.

22. In a screw-making machine, the combination with a revoluble tool-carrying spindle supported in a fixed head, of a main driving shaft, a gear-carrying shaft parallel therewith and at one side of said head, a screw-slotting-tool carrier supported for oscillating movement upon said gear-shaft, a slotting-tool spindle revolubly mounted in said carrier, means for driving said spindle from said gear-shaft and means for imparting a swinging movement to said carrier, substantially as described.

23. In a screw-making machine, the combination with a hollow tool-carrying spindle revolubly supported in a fixed head, of a screw-blank carrier supported for longitudinal movement in said spindle, the driving-shaft, a gear-wheel thereon, a worm-wheel, connections thereto from said gear-wheel, a screw-slotting tool carrier oscillatory about said worm-shaft, a revoluble slotting-tool upon said carrier and concentric with the axis of the screw-blank carrier and at one side of the spindle-head, and a worm-wheel in mesh with the worm upon said worm-shaft for rotating said slotting-tool, substantially as described.

24. In a screw-making machine, the combination with a hollow tool-carrying spindle revolubly supported in a fixed head, and with means for rotating said spindle, of a reciprocatory screw-blank carrier, a slotting-tool carrier supported for oscillating movement concentric to said screw-blank carrier and carrying a revoluble slotting-saw, means for rotating said saw, and means for oscillating said carrier, substantially as described.

25. In a screw-making machine, the combination with the main driving-shaft carrying a worm, and with a revoluble tool-carrying spindle and its driving mechanism, of a reciprocating screw-blank carrier supported in said spindle and adapted for carrying a blank beyond the end of said spindle, means for reciprocating said blank-carrier, a slotting-tool carrier supported for oscillatory movement upon said driving shaft, a tool-spindle revolubly carried in said carrier and carrying a worm-wheel at one end thereof in mesh with the worm of the driving-shaft, means for rotating said driving-shaft, and means for oscillating said carrier, substantially as described.

26. In a screw-making machine, the combination with a wire-carrier, of a revoluble tool-spindle the head of which has longitudinal and transverse slide-ways, a tool-slide supported for transverse sliding movement in the transverse slide-ways and carrying one or more tools, tool-traversing cams supported in the longitudinal slide-ways and operatively connected with the tool-slide, a cap secured to the end of the tool-head and having a transverse annular recess in axial alignment with said spindle, cam-mechanism in connection with and adapted for reciprocating the tool-traversing cams to operate the tool-slide, and means for operating the wire-carrier to bring the wire thereby into alignment with the tool-spindle, substantially as described.

27. In a screw-making machine, in combination, a revoluble tool-spindle the head of which has two longitudinal slide-ways one at each side thereof and one transverse slide-way at the end thereof, a tool-carrying slide supported in the transverse slide-way and having oblique parallel cam-grooves, pins upon the tool-slide and entering said grooves, a transversely-recessed wire-support secured to the end of the spindle-head, a rock-shaft connected with and adapted for reciprocating the tool-traversing cam, a cam in connection with and adapted for rocking said rock-shaft, means for rotating the spindle, means for rotating the rock-shaft-operating cam, and a wire-carrier in position and adapted for presenting the wire to the action of the tools carried by the slide of the spindle-head, substantially as described and for the purpose set forth.

FRANCIS H. RICHARDS.

Witnesses:
 FRED. J. DOLE,
 ROBT. V. RUDDELL.